US008890448B2

(12) United States Patent
Putkinen et al.

(10) Patent No.: US 8,890,448 B2
(45) Date of Patent: Nov. 18, 2014

(54) BRAKING APPARATUS, ELECTRIC DRIVE, AND ELEVATOR SYSTEM

(75) Inventors: Esa Putkinen, Hyvinkää (FI); Antti Kallioniemi, Jokela (FI); Juha-Matti Nikander, Ojakkala (FI); Paavo Merilinna, Tampere (FI); Risto Komulainen, Klaukkala (FI)

(73) Assignee: Kone Corporation, Helsinki (FI)

(*) Notice: Subject to any disclaimer, the term of this patent is extended or adjusted under 35 U.S.C. 154(b) by 0 days.

(21) Appl. No.: 13/462,341

(22) Filed: May 2, 2012

(65) Prior Publication Data

US 2012/0217098 A1 Aug. 30, 2012

Related U.S. Application Data

(63) Continuation of application No. PCT/FI2010/050867, filed on Nov. 1, 2010.

(30) Foreign Application Priority Data

Nov. 2, 2009 (FI) ...................................... 20096131

(51) Int. Cl.
*H02P 3/00* (2006.01)
*B66B 1/32* (2006.01)
*B66B 5/02* (2006.01)

(52) U.S. Cl.
CPC .... *B66B 1/32* (2013.01); *B66B 5/02* (2013.01)
USPC ............ 318/371; 318/372; 318/375; 318/376

(58) Field of Classification Search
USPC .......................... 318/371, 372, 374, 375, 376
See application file for complete search history.

(56) References Cited

U.S. PATENT DOCUMENTS

| | | | | | |
|---|---|---|---|---|---|
| 3,458,790 | A | * | 7/1969 | Wilkerson | 318/258 |
| 3,488,570 | A | * | 1/1970 | Wortman et al. | 318/87 |
| 3,657,625 | A | * | 4/1972 | Miller et al. | 318/370 |
| 3,665,272 | A | * | 5/1972 | Spiess et al. | 318/758 |
| 3,687,235 | A | * | 8/1972 | Mitsui et al. | 187/296 |
| 3,774,095 | A | * | 11/1973 | Coccia | 318/371 |
| 3,804,043 | A | * | 4/1974 | Benson et al. | 112/275 |
| 3,930,191 | A | * | 12/1975 | Loderer | 318/376 |
| 3,969,661 | A | * | 7/1976 | Morinaga et al. | 318/375 |

(Continued)

FOREIGN PATENT DOCUMENTS

| | | | |
|---|---|---|---|
| CN | 101327897 | A | 12/2008 |
| CN | 101512891 | A | 8/2009 |

(Continued)

OTHER PUBLICATIONS

Chinese Office Action dated Oct. 23, 2013, issued in Chinese Application No. 201080060287.7.

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

The invention relates to a braking apparatus, an electric drive and an elevator system. The braking apparatus comprises an apparatus for dynamic braking, for braking an electric machine with dynamic braking, an input for the control signal of the braking apparatus, and also a controller, for controlling the apparatus for dynamic braking as a response to the aforementioned control signal of the braking apparatus.

25 Claims, 4 Drawing Sheets

(56) References Cited

U.S. PATENT DOCUMENTS

| | | | | | |
|---|---|---|---|---|---|
| 4,225,813 | A * | 9/1980 | Sahasrabudhe | 318/371 |
| 5,070,290 | A | 12/1991 | Iwasa et al. | |
| 5,361,022 | A | 11/1994 | Brown | |
| 5,384,522 | A * | 1/1995 | Toriyama et al. | 318/371 |
| 5,497,065 | A * | 3/1996 | Ito | 318/802 |
| 5,498,941 | A * | 3/1996 | Kim | 318/371 |
| 5,698,823 | A * | 12/1997 | Tanahashi | 187/296 |
| 6,441,573 | B1 * | 8/2002 | Zuber et al. | 318/375 |
| 7,849,975 | B2 * | 12/2010 | Ketonen et al. | 187/394 |
| 8,154,228 | B2 * | 4/2012 | Yundt et al. | 318/375 |
| 8,207,700 | B2 * | 6/2012 | Syrman et al. | 318/807 |
| 8,408,364 | B2 * | 4/2013 | Kangas | 187/393 |
| 2009/0167218 | A1 | 7/2009 | Kallioniemi et al. | |

FOREIGN PATENT DOCUMENTS

| | | | |
|---|---|---|---|
| CN | 101535163 | A | 9/2009 |
| EP | 1520829 | A1 | 4/2005 |
| WO | WO-2008031915 | A1 | 3/2008 |

* cited by examiner

BRAKING APPARATUS, ELECTRIC DRIVE, AND ELEVATOR SYSTEM

CROSS REFERENCE TO RELATED APPLICATIONS

This application is a continuation of International Application Number PCT/FI2010/050867 filed on Nov. 1, 2010 and claims priority to Finnish Application Number FI 20096131 filed on Nov. 2, 2009, the entire contents of each of which are hereby incorporated herein by reference.

FIELD OF THE INVENTION

The invention relates to solutions for braking an electric machine, and more particularly to braking apparatuses, electric drives and elevator systems for braking an electric machine.

BACKGROUND OF THE INVENTION

Safe operation of an elevator system in the event of a malfunction, such as an electricity outage, is ensured with the machinery brake of a hoisting machine. In addition, so-called dynamic braking is often used in elevator hoisting machines, in which case the windings of the hoisting machine are short-circuited with dynamic braking switches, e.g. during a standstill of an elevator. Racing of the hoisting machine can be prevented with a short-circuit of the windings because when the hoisting machine moves the source voltage induced in the short-circuited windings produces a current that endeavors to brake the movement of the hoisting machine. Most of the electrical energy produced in dynamic braking in this case is converted to heat in the winding resistances of the hoisting machine.

Instead of short-circuiting the windings, the electrical energy produced in dynamic braking can also be supplied to a load outside the hoisting machine, such as to a power resistor. In this way heating of the hoisting machine can be reduced during dynamic braking. The power resistor needed is, however, generally rather large in size; in addition, a free space must be reserved around it owing to the strong heat rise occurring in the resistor.

The contacts of a contactor, for instance, can be used as switches of dynamic braking. In certain exceptional situations, such as in connection with brake tests, the dynamic braking function must be temporarily removed from use. Sometimes the function is removed from use by detaching the contacts of the contactors of dynamic braking from the supply cables of the hoisting machine. In this case there is a danger that it is forgotten to re-connect the contacts of the contactors of dynamic braking after the tests have been performed. Without dynamic braking, an elevator car may race when the brake is left free, so forgetting the re-connection of the contacts of the contactors of dynamic braking may cause a dangerous situation to a serviceman working in the elevator hoistway.

Instead of the contacts of the contactors also the solid-state switches of an inverter controlling the hoisting machine, can be used as switches of dynamic braking. A substantially high current may flow in the solid-state switches during dynamic braking. The current causes considerable warming in the power semiconductors, which again could shorten the service life of the inverter. For this reason, the current stress caused to the solid-state switches by dynamic braking must also be taken into consideration when dimensioning the inverter.

SUMMARY OF THE INVENTION

Owing to the aforementioned reasons, among others, the invention discloses an improved braking apparatus, electric drive and elevator system. The aim of the invention is also e.g. to improve the safety of the braking apparatus, electric drive and elevator system and also to improve the reliability of the apparatus for dynamic braking.

In relation to the characteristic attributes of the invention, reference is made to the claims.

The first aspect of the invention relates to a braking apparatus.

According to one or more embodiments of the invention, the braking apparatus comprises an apparatus for dynamic braking, for braking the electric machine with dynamic braking, an input for the control signal of the braking apparatus, and also a controller for controlling the apparatus for dynamic braking as a response to the aforementioned control signal of the braking apparatus. The aforementioned controller comprises control modes for controlling the apparatus for dynamic braking according to the control mode to be used at any given time. In this case the apparatus for dynamic braking can be controlled, if needed, in a different way in different operating situations, such as during normal operation of the electric machine, and also in connection with an operational non-conformance or dangerous situation. The aforementioned controller can comprise a microprocessor and the aforementioned control modes can be implemented in a manner specified in the software of the microprocessor.

According to one or more embodiments of the invention, the control mode to be used is selected on the basis of the control signal of the braking apparatus. In this case the control mode can be selected, e.g. on the basis of the control signal of normal drive or on the basis of the control signal of service drive. The control mode can also be selected e.g. on the basis of the status data of the safety circuit of the elevator.

According to one or more embodiments of the invention, the braking apparatus comprises a machinery brake for braking the electric machine. One control signal of the braking apparatus is an emergency stop signal, and the controller is arranged to activate the apparatus for dynamic braking after a delay with respect to the machinery brake in an emergency stop situation. In this case, when the machinery brake is activated it engages to brake the movement of the electric machine before the apparatus for dynamic braking is activated. If the machinery brake functions normally, the movement of the electric machine starts to decelerate after the machinery brake has been activated. The speed of the electric machine has thus had time to decelerate before dynamic braking starts. When the speed of the electric machine decelerates, the current stress of the switch/switches of dynamic braking decreases, which lengthens the lifetime of the switches and thus improves the reliability of the apparatus for dynamic braking. If the machinery brake is defective and the speed of the electric machine has not considerably decelerated when dynamic braking starts, high current stress is exerted on the switch/switches of dynamic braking; in this case what is more essential than the current stress of the switches of dynamic braking is, however, that the movement of the electric machine can be braked with the apparatus for dynamic braking also in a fault situation of the machinery brake, and thus the safety of the emergency stop can be improved.

According to one or more embodiments of the invention, the apparatus for dynamic braking comprises a controllable switch and the controller is fitted in connection with the control pole of the aforementioned controllable switch, for controlling the controllable switch with a switching reference formed by the controller. Thus the current of dynamic braking can also possibly be adjusted during dynamic braking.

According to one or more embodiments of the invention, the controller is arranged to activate the apparatus for dynamic braking after a set activation delay of dynamic braking subsequent to receiving an emergency stop signal.

According to one or more embodiments of the invention, the machinery brake is arranged to be activated after a certain activation delay of machinery braking subsequent to receiving an emergency stop signal, and the aforementioned activation delay of dynamic braking is set to be longer than the activation delay of machinery braking. In this case after an activation delay of machinery braking, the machinery brake engages to brake the movement of the electric machine before the activation of the apparatus for dynamic braking, which activation occurs after the activation delay of dynamic braking. If the machinery brake functions normally the movement of the electric machine starts to decelerate after the machinery brake is activated. The speed of the electric machine has thus had time to decelerate before dynamic braking starts. When the speed of the electric machine decelerates, the current stress of the switch/switches of dynamic braking decreases, which lengthens the lifetime of the switches and thus improves the reliability of the apparatus for dynamic braking. If the machinery brake is defective and the speed of the electric machine has not considerably decelerated when dynamic braking starts, high current stress is exerted on the switch/switches of dynamic braking; in this case what is more essential than the current stress of the switches of dynamic braking is, however, that the movement of the electric machine can be braked with the apparatus for dynamic braking also in a fault situation of the machinery brake, and thus the safety of the emergency stop can be improved.

According to one or more embodiments of the invention, the controller comprises an input for the speed data of the electric machine and the activation delay of dynamic braking is determined on the basis of the speed data of the electric machine. In this case the activation delay of dynamic braking can be determined, e.g. such that the higher the speed of the electric machine is when the activation signal arrives at the braking apparatus, the longer is the activation delay of dynamic braking. The longer the activation delay of dynamic braking is, the more the machinery brake has time to decelerate the speed of the electric machine before dynamic braking starts.

According to one or more embodiments of the invention, the controller comprises a bus for receiving the speed reference of the electric machine and the activation delay of dynamic braking is determined on the basis of the speed data of the electric machine or on the basis of the speed reference of the electric machine, always using in the determination whichever of these that has the greater absolute value. For instance, a pulse encoder measuring the movement of the electric machine may malfunction such that the pulses of the encoder signal completely cease to travel, in which case the speed data indicated by the encoder signal goes to zero. If the activation delay is determined from the speed reference of the electric machine, the activation delay can thus be determined irrespective of the defect of the encoder or of another motion measurement sensor.

According to one or more embodiments of the invention, the braking apparatus comprises a user interface, and the controller comprises a memory, and a data transfer connection is made between the user interface and the controller, for recording the control parameter of dynamic braking to be supplied from the user interface into the memory of the controller. In this case the control parameters of dynamic braking can be changed for each specific use, which improves the functionality of dynamic braking; in one embodiment of the invention the controller can also send the status data of the apparatus for dynamic braking to the user interface, which facilitates e.g. troubleshooting of the apparatus for dynamic braking.

According to one or more embodiments of the invention, the control parameter of dynamic braking refers to at least one of the following: prevention mode of dynamic braking, normal mode of dynamic braking, nominal speed of the electric machine, average deceleration of the electric machine with machinery braking, status data of the apparatus for dynamic braking. Thus the operation of the apparatus for dynamic braking can be temporarily prevented via the user interface by sending a control parameter that refers to prevention mode of dynamic braking from the user interface to the controller. Prevention mode of dynamic braking can again be removed and dynamic braking can be taken into use by sending a control parameter that refers to normal mode of dynamic braking from the user interface to the controller. The activation delay of dynamic braking can be set as proportional to the nominal speed of the electric machine such that the activation delay shortens as the speed of the electric machine falls below the nominal speed and the activation delay increases as the speed of the electric machine increases above the nominal speed. In one embodiment of the invention the activation delay t is defined by means of the instantaneous speed v of the electric machine and by means of the average deceleration of the electric machine with machinery braking a from the equation:

$$t = \frac{v}{a}$$

The average deceleration of the electric machine with machinery braking a is preferably given the value of approx. 1 m/s^2.

According to one or more embodiments of the invention, the braking apparatus comprises a machinery brake for braking the electric machine, an apparatus for dynamic braking, for braking the electric machine with dynamic braking, and also an input for an emergency stop signal. Both the machinery brake and the apparatus for dynamic braking are arranged to be activated as a response to the aforementioned emergency stop signal such that the apparatus for dynamic braking is arranged to be activated after a delay with respect to the machinery brake.

The second aspect of the invention relates to an electric drive.

According to one or more embodiments of the invention, the electric drive comprises a permanent-magnet synchronous motor. The permanent magnets in the rotor of the permanent-magnet synchronous motor induce a voltage in the stator windings immediately the rotor starts moving. In one embodiment of the invention the aforementioned voltage induced in the stator windings of the permanent magnets is utilized in the electricity supply of the controller, in which case dynamic braking can start after the speed of the rotor, and thus the voltage induced in the stator windings, have increased sufficiently in order to produce the operating electricity needed by the controller. In this case dynamic braking can be performed without an external energy source, such as without an electricity network or accumulator.

According to one or more embodiments of the invention, the electric drive comprises a frequency converter to be connected to the electric machine for driving the electric machine, and the frequency converter comprises an inverter, for supplying variable amplitude and variable frequency current to the electric machine.

According to one or more embodiments of the invention, the controller is fitted in connection with the control poles of the switches of the upper branch of the inverter and/or of the lower branch of the inverter, for switching the switches of only the lower branch of the inverter, or alternatively of only the upper branch of the inverter, with the switching reference of dynamic braking, which switching reference is formed by the controller. Dynamic braking can thus be performed, e.g. in the manner described in patent application EP 2062348 A1, such that the power supply from the direct-current intermediate circuit of the inverter to the electric machine is prevented during dynamic braking.

According to one or more embodiments of the invention, the apparatus for dynamic braking is arranged to short-circuit the excitation windings of the electric machine, for dynamic braking of the electric machine. Most of the electrical energy produced in dynamic braking is in this case converted to heat in the winding resistances of the electric machine, and no separate load, such as a power resistor, is needed to consume the electrical energy produced in the braking.

According to one or more embodiments of the invention, the electric drive is implemented without a braking resistor.

According to one or more embodiments of the invention, the frequency converter comprises a network inverter-rectifier, for supplying the electrical energy produced in regenerative operation of the electric machine to the electricity network. When dynamic braking is in this case performed by short-circuiting the excitation windings of the electric machine and by consuming most of the electrical energy produced in dynamic braking in the winding resistances of the electric machine, the power supply appliance of the electric machine can be implemented without a separate power resistor, which simplifies the power supply appliance and reduces the space requirement of the power supply appliance.

According to one or more embodiments of the invention, the frequency converter comprises a direct-current intermediate circuit, and the electric drive comprises a power source, the input of which is connected to the direct-current intermediate circuit of the frequency converter, and the output of which power source is connected to the electricity supply of the controller, for utilizing the electrical energy produced in regenerative operation of the electric machine as operating electricity of the controller. The voltage induced in the stator windings of the moving rotor of the electric machine can in this case also be utilized in the electricity supply of the controller, in which case dynamic braking can start after the speed of the rotor and thus the voltage induced in the stator windings have increased sufficiently in order to produce the operating electricity needed by the controller. In this case dynamic braking can also be performed, if necessary, without an external energy source, such as without an electricity network or accumulator.

The third aspect of the invention relates to an elevator system.

According to one or more embodiments of the invention, the elevator hoisting machine and the frequency converter are fitted in an elevator hoistway. In these types of elevator systems without machine room a large part of the servicing work of the elevator occurs in the elevator hoistway. By means of an elevator system according to the invention, working safety in the elevator hoistway can be improved.

According to one or more embodiments of the invention, the aforementioned user interface is fitted outside the elevator hoistway. In this case the control parameters of dynamic braking can be changed from outside the elevator hoistway, e.g. from the stopping floor. In one embodiment of the invention also the diagnostics data, such as the status data of the apparatus for dynamic braking can be read using the same user interface.

According to one or more embodiments of the invention, the controller is arranged to switch into prevention mode of dynamic braking when the controller receives a parameter that refers to prevention mode of dynamic braking from the user interface, and the controller is arranged to switch from prevention mode of dynamic braking into normal mode of dynamic braking when it detects at least one of the following:

- the controller detects the initiation of the next elevator run
- the controller receives a parameter that refers to normal mode of dynamic braking from the user interface
- the controller detects a communication break in the data transfer connection between the user interface and the controller.

In this way it can be ensured that the dynamic braking function is certain to return to use after being temporarily removed from use.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
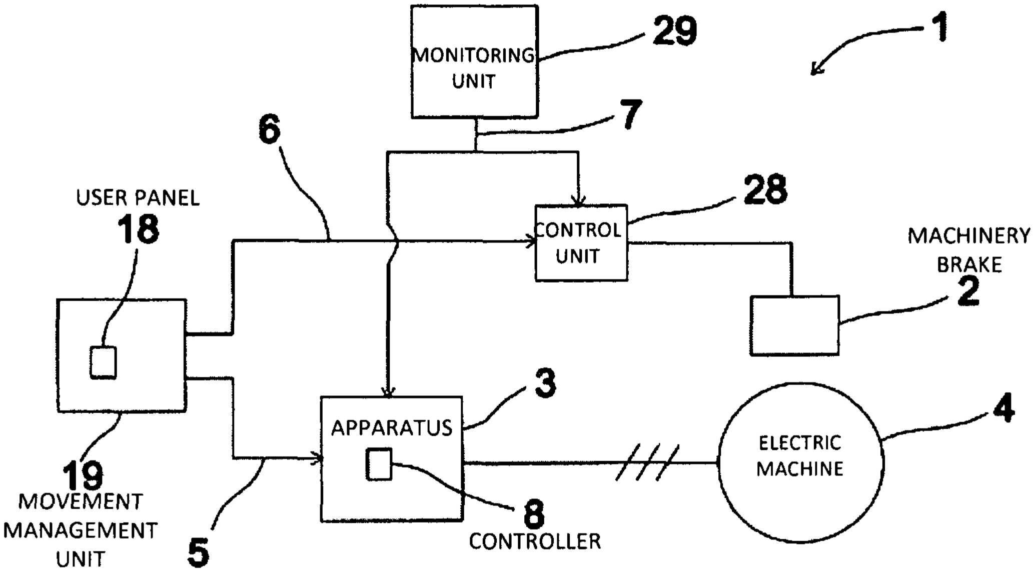
FIG. 1 presents a braking apparatus according to the invention as a block diagram

FIG. 1 presents as a block diagram a braking apparatus 1, which comprises a machinery brake 2, and also an apparatus 3 for dynamic braking for braking an electric machine 4. The apparatus 3 for dynamic braking comprises a controller 8. The apparatus for dynamic braking also comprises controllable switches, which are connected between the stator windings of the electric machine. The controller 8 is fitted in connection with the control poles of the aforementioned controllable switches, for controlling the controllable switches with the switching reference formed by the controller 8. When dynamic braking is activated, the controller closes the aforementioned switches connected between the stator windings of the electric machine, in which case the stator windings connect in short-circuit with each other. When the electric machine moves, a source voltage is induced in the short-circuited stator windings, which source voltage causes current, which current endeavors to brake the movement of the electric machine. Most of the electrical energy produced in dynamic braking in this case changes to heat in the winding resistances of the electric machine.

The apparatus 3 for dynamic braking and the movement management unit 19 of the electric machine are connected to each other with a serial communications bus, via which the movement management unit 19 of the electric machine and the controller 8 are connected together. The movement management unit 19 of the electric machine sends control parameters and also control signals 5, among others, to the controller 8 via the serial communications bus. The movement management unit 19 of the electric machine comprises a user panel 18, from the keyboard of which the control parameters can be entered. The controller 8, on the other hand, sends the status data of the apparatus for dynamic braking, among other things, to the movement management unit 19 of the electric machine via the serial communications bus. The status data can be read from the display of the user panel 18 of the movement management unit and a possible failure of the apparatus 3 for dynamic braking, among other things, can be deduced on the basis of the status data.

The movement management unit 19 sends a starting signal 5 of the run to the controller 8, in which case the controller 8 switches its control mode and stops dynamic braking by opening the aforementioned switches connected between the stator windings of the electric machine. At the same time the movement management unit 19 also sends an opening signal 6 of the machinery brake to the control unit 28 of the machinery brake. The control unit 28 of the machinery brake controls the machinery brake 2 to open as a response to the opening signal of the machinery brake by supplying current to the magnetizing coil of the electromagnet of the machinery brake. At the end of the run, the movement management unit 19 sends an end signal 5 of the run to the controller 8, in which case the controller again switches its control mode and activates dynamic braking by closing the aforementioned switches connected between the stator windings of the electric machine. The movement management unit 19 also sends an activation signal of the machinery brake to the control unit 28 of the machinery brake, as a response to which activation signal the control unit of the machinery brake activates the machinery brake to brake the movement of the electric machine by disconnecting the current supply to the magnetizing coil of the electromagnet of the machinery brake.

The monitoring unit 29 of the electric drive monitors the operation of the electric drive and forms an emergency stop signal 7 when it detects a possible dangerous situation. Both the control unit 28 of the machinery brake and the controller 8 comprise an input for the emergency stop signal 7 formed by the monitoring unit 29 of the electric drive. The control unit 28 of the machinery brake activates the machinery brake 2 by disconnecting the current supply to the coil of the electromagnet of the machinery brake after it receives an emergency stop signal 7.

When it receives an emergency stop signal the controller 8 switches into emergency stop mode. In emergency stop mode the controller 8 activates the apparatus 3 for dynamic braking after a set activation delay of dynamic braking subsequent to receiving the emergency stop signal 7 such that the apparatus 3 for dynamic braking is activated after a delay with respect to the machinery brake 2. The controller 8 comprises an input for the speed data of the electric machine 4. The speed data of the electric machine 4 is determined by an encoder, which is mechanically in contact with a rotating part of the electric machine 4. The controller 8 also receives the speed reference of the electric machine 4, i.e. the target value of the speed of rotation of the electric machine, from the movement management unit 19. The movement management unit 19 sends the speed reference to the apparatus 3 for dynamic braking via the serial communications bus between the movement management unit 19 and the apparatus 3 for dynamic braking. The controller 8 determines the activation delay of dynamic braking on the basis of the speed data of the electric machine and the speed reference of the electric machine always using in the determination whichever of these that has the greater absolute value. The activation delay t of dynamic braking is defined by means of the instantaneous speed/speed reference v of the electric machine and also by means of the average deceleration with machinery braking a from the equation:

$$t = \frac{v}{a}$$

In this case the higher the speed of rotation v of the electric machine is when the controller 8 receives an emergency stop signal 7, the longer is the activation delay of dynamic braking.

Figure 4:
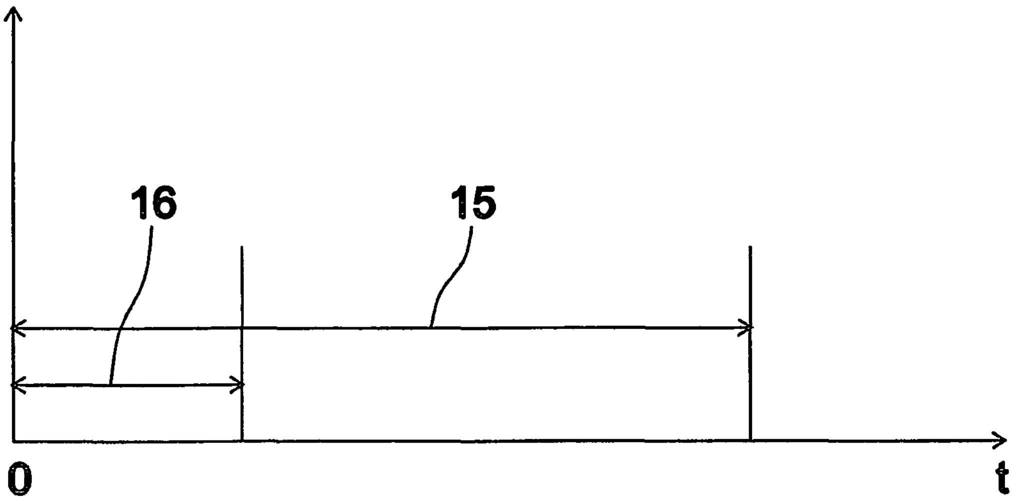
FIG. 4 illustrates an activation delay of machinery braking and also an activation delay of dynamic braking

The machinery brake 2 is activated after a certain activation delay of machinery braking. The activation delay is affected by, among other things, the disconnection time of the current of the coil of the electromagnet of the machinery brake 2 and also by the time it takes to engage the armature part to mechanically brake the movement of a rotating part of the electric machine 4. After the armature part is engaged to mechanically brake the movement of the rotating part of the electric machine 4, and thus after the machinery brake is activated, the speed of rotation of the electric machine 4 starts to decelerate such that after the activation delay of dynamic braking the speed of rotation has decelerated sufficiently in order to start dynamic braking. In this case the controller 8 short-circuits the stator windings of the electric machine 4 in the manner described above. Because the source voltage induced in the stator windings of the electric machine 4 is proportional to the speed of rotation, reducing the speed of rotation also affects the short-circuit current flowing in the stator windings at the starting moment of dynamic braking such that the short-circuit current decreases as the speed of rotation decreases. FIG. 4 illustrates some activation delays of machinery braking 16 and of dynamic braking 15. At the moment t=0 the control unit 28 of the machinery brake and the controller 8 receive an emergency stop signal. The machinery brake 2 is activated to brake the movement of the electric machine 4 after the activation delay 16 of machinery braking. The controller 8 activates the apparatus 3 for dynamic braking after the activation delay 15 of dynamic braking by short-circuiting the stator windings of the electric machine 4. According to FIG. 4, the activation delay 15 of dynamic braking is longer than the activation delay 16 of machinery braking, in which case the apparatus 3 for dynamic braking is activated after a delay with respect to the machinery brake 2.

Figure 2A:
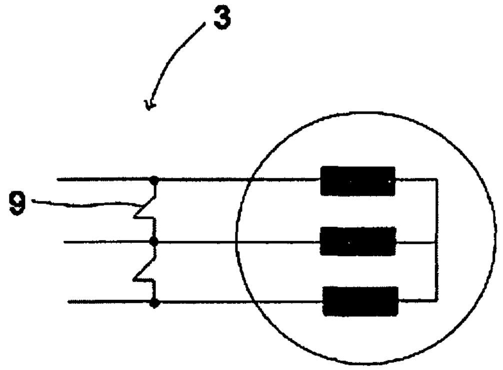
FIG. 2*a* illustrates an apparatus for dynamic braking according to the invention
Figure 2B:
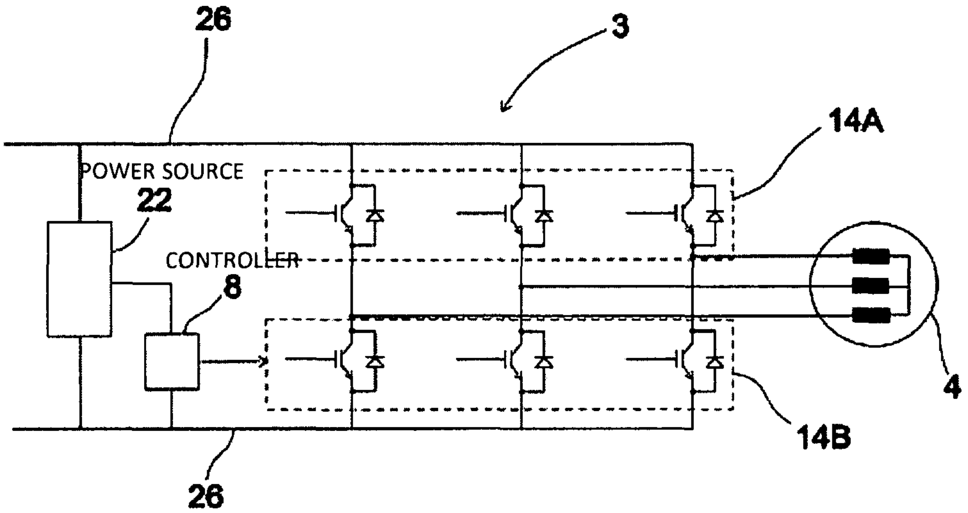
FIG. 2*b* illustrates a second apparatus for dynamic braking according to the invention

FIGS. 2*a* and 2*b* illustrate in more detail some apparatuses 3 for dynamic braking, which are also suited for use in connection with the embodiment of FIG. 1.

The apparatus 3 for dynamic braking of FIG. 2*a* comprises a contactor, the break contacts of which are connected between the stator windings of the electric machine 4. In this case dynamic braking is always activated when current is not flowing in the control coil of the contactor. To stop dynamic braking a current is supplied to the control coil of the contactor, as a result of which the contacts open and the short-circuit between the stator windings is disconnected.

The apparatus 3 for dynamic braking of FIG. 2*b* is implemented with an inverter, with which variable amplitude and variable frequency current is also supplied to the electric machine 4 and thus the movement of the electric machine 4 is adjusted during normal operation of the electric machine. The controller 8 is fitted in connection with the control poles of the switches of the upper branch 14A of the inverter and/or of the lower branch 14B of the inverter, for switching the switches of only the lower branch 14B of the inverter, or alternatively of only the upper branch 14A of the inverter, with the switching reference of dynamic braking, which switching reference is formed by the controller 8. Dynamic braking can thus be performed, e.g. in the manner described in patent application EP 2062348 A1 such that the power supply from the direct-current intermediate circuit 26 of the inverter to the electric machine 4 is prevented during dynamic braking. The aforementioned switches of the inverter are preferably solid-state switches, such as IGBT transistors, MOSFET transistors or corresponding. According to FIG. 2*b* the apparatus for dynamic braking comprises a power source 22, the input of which is connected to the direct-current intermediate circuit 26 of the inverter. The output of the power source 22 is connected to the electricity supply of the controller 8, in which case the electrical energy produced during motor braking of the electric machine 4, i.e. in regenerative operation of the electric machine, 4 can be utilized as operating electricity of the controller 8.

Figure 3A:
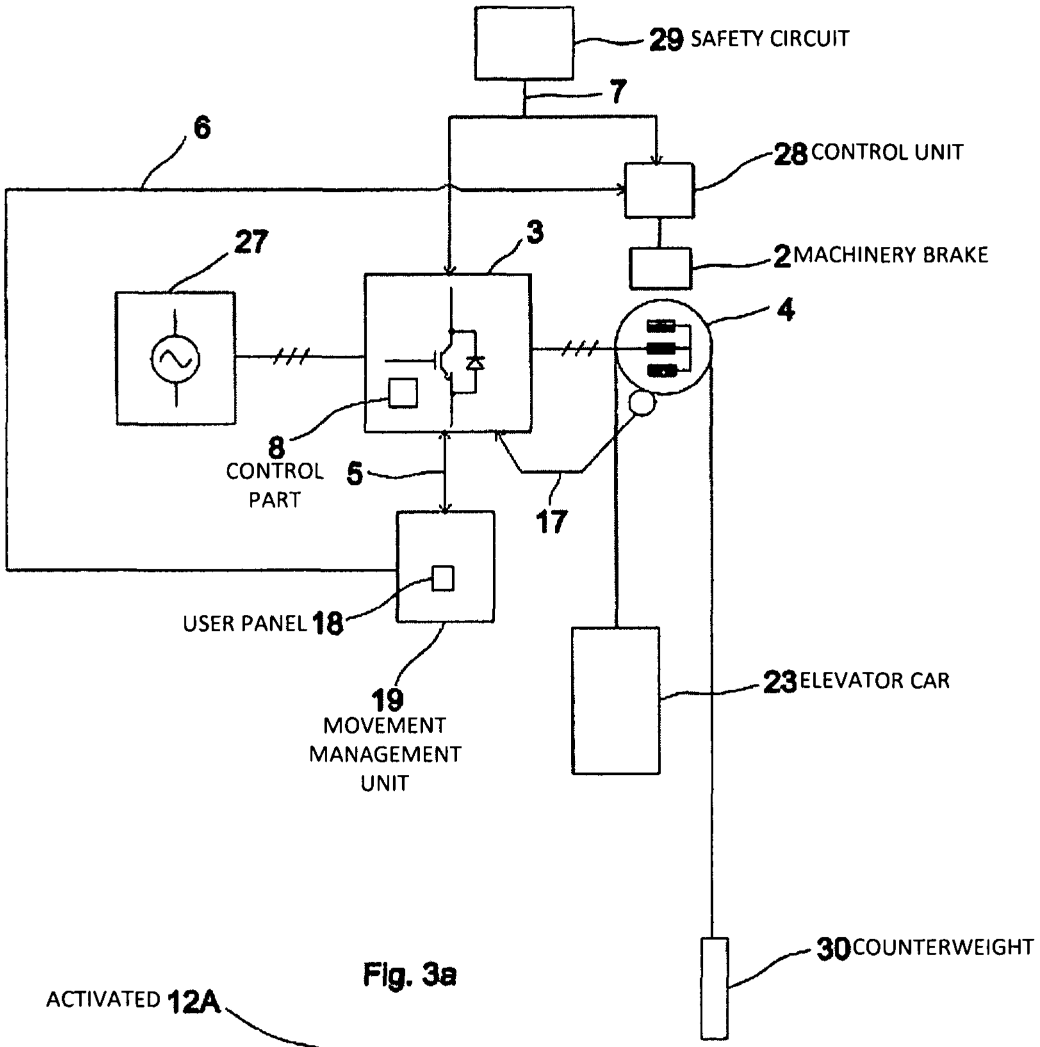
FIG. 3*a* presents an elevator system according to the invention as a block diagram

FIG. 3*a* presents an elevator system, in which an elevator car 23 and a counterweight 30 are suspended in the elevator hoistway with elevator ropes, a belt or corresponding passing via the traction sheave of the hoisting machine 4. The torque moving the elevator car 23 is produced in the hoisting machine 4 with a permanent-magnet synchronous motor. Current supply from the electricity network 27 to the permanent-magnet synchronous motor occurs during normal operation of the elevator with a frequency converter. The frequency converter comprises an inverter, with which the voltage of the direct-current intermediate circuit of the frequency converter is changed to a variable frequency and variable amplitude supply voltage of the permanent-magnet synchronous motor. The frequency converter also comprises a network inverter-rectifier, with which the electrical energy produced during motor braking of the hoisting machine 4 is returned to the electricity network 27. Because the electrical energy produced during motor braking is returned to the electricity network 27, the power supply system of the hoisting machine is implemented without a separate braking resistor. A braking resistor refers to the type of power resistor, with which the electrical energy produced during motor braking is converted into heat instead of returning it to the electricity network.

The braking apparatus of the elevator system of FIG. 3*a* comprises a machinery brake 2 and also an apparatus 3 for dynamic braking for braking the hoisting machine 4. The apparatus 3 for dynamic braking is implemented using the same inverter of the frequency converter, with which inverter current is also supplied to the permanent-magnet synchronous motor of the hoisting machine 4 during normal operation of the elevator. The controller 8 of dynamic braking is integrated into the control unit of the frequency converter, and it is here called a control part 8 of dynamic braking. The control part 8 of dynamic braking is fitted in connection with the control poles of the switches of the upper branch 14A of the inverter and/or of the lower branch 14B of the inverter, for switching the switches of only the lower branch 14B of the inverter, or alternatively of only the upper branch 14A of the inverter, with the switching reference of dynamic braking, which switching reference is formed by the control part 8. Dynamic braking can thus be performed, e.g. in the manner described in patent application EP 2062348 A1 such that the power supply from the direct-current intermediate circuit 26 of the inverter to the hoisting machine 4 is prevented during dynamic braking. The controllable switches of the inverter are preferably solid-state switches.

When dynamic braking is activated the control part 8 switches into the activation mode of dynamic braking and it closes the aforementioned switches of the upper branch or the lower branch of the inverter, in which case the stator windings connect in short-circuit with each other. When the hoisting machine 4 moves, e.g. owing to the imbalance of the net load of the elevator, a source voltage is induced in the short-circuited stator windings, which source voltage causes current, which current endeavors to brake the movement of the hoisting machine 4. Most of the electrical energy produced in dynamic braking in this case changes to heat in the winding resistances of the hoisting machine 4, and there is no need for a separate braking resistor.

The frequency converter comprises a power source 22, the input of which is connected to the direct-current intermediate circuit 26 of the inverter. The output of the power source 22 is connected to the electricity supply of the control unit of the frequency converter, in which case the electrical energy produced during motor braking of the hoisting machine 4, i.e. in regenerative operation of the hoisting machine 4, can be utilized as operating electricity of the control unit. Since the rotor magnetization of the hoisting machine 4 is implemented with the permanent magnets of the permanent-magnet synchronous motor, source voltage is induced in the stator windings always when the hoisting machine 4 starts to rotate. In this case dynamic braking can be started without an external energy source immediately when the source voltage of the stator has increased sufficiently to excite the power source 22, which after being excited starts to supply operating electricity to the control part 8 of dynamic braking. Dynamic braking can start after the electricity supply of the control part 8 has started.

The frequency converter and the movement management unit 19 of the elevator car are connected to each other with a serial communications bus, via which the movement management unit 19 of the elevator car and the control part 8 of dynamic braking are connected together. The movement management unit 19 of the elevator car sends control parameters and also control signals 5, among other things, to the control part 8 of dynamic braking via the serial communications bus. The movement management unit 19 of the elevator car comprises a user panel 18, from the keyboard of which the control parameters can be entered. The user panel 18 is disposed on the stopping floor outside the elevator hoistway. The control part 8 of dynamic braking, for its part, sends the status data of the apparatus 3 for dynamic braking, among other things, to the movement management unit 19 of the elevator car via the serial communications bus. The status data can be read from the display of the user panel 18 of the movement management unit and a possible failure of the apparatus 3 for dynamic braking, among other things, can be deduced on the basis of the status data.

The movement management unit 19 of the elevator car sends a starting signal 5 of the run to the control part 8 of dynamic braking, in which case the control part 8 switches its control mode and stops dynamic braking by opening the aforementioned switches of the upper branch of the inverter or of the lower branch of the inverter. At the same time the movement management unit 19 of the elevator car also sends an opening signal 6 of the machinery brake to the control unit 28 of the machinery brake. The control unit 28 of the machinery brake controls the machinery brake 2 to open as a response to the opening signal 6 of the machinery brake by supplying current to the magnetizing coil of the electromagnet of the machinery brake. At the end of the run the movement management unit 19 of the elevator car sends an end signal 5 of the run to the control part 8 of dynamic braking, in which case the control part 8 again switches its control mode and activates dynamic braking by closing the aforementioned switches of the upper branch of the inverter or of the lower branch of the inverter. The movement management unit 19 of the elevator car also sends an activation signal 6 of the machinery brake to the control unit 28 of the machinery brake, as a response to which activation signal the control unit of the machinery brake activates the machinery brake to brake the movement of the hoisting machine 4 by disconnecting the current supply to the magnetizing coil of the electromagnet of the machinery brake.

The safety circuit 29 of the elevator monitors the operation of the elevator system and forms an emergency stop signal 7 when it detects a possible dangerous situation. Both the control unit 28 of the machinery brake and the control part 8 of dynamic braking comprise an input for the emergency stop signal 7 formed by the safety circuit 29 of the elevator. The control unit 28 of the machinery brake activates the machinery brake 2 by disconnecting the current supply to the coil of the electromagnet of the machinery brake after it receives an emergency stop signal 7.

When it receives an emergency stop signal the control part 8 of dynamic braking switches into emergency stop mode. The control part 8 of dynamic braking activates dynamic braking after a set activation delay of dynamic braking subsequent to receiving an emergency stop signal 7 such that dynamic braking is activated after a delay with respect to the machinery brake 2. The control part 8 of dynamic braking comprises an input for the speed data 17 of the hoisting machine 4. The speed data 17 of the hoisting machine 4 is determined by an encoder, which is mechanically in contact with the rotating part of the hoisting machine 4. The control part 8 of dynamic braking also receives the speed reference of the hoisting machine 4, i.e. the speed of rotation of the hoisting machine, and thus also the target value of the speed of the elevator car 23, from the movement management unit 19 of the elevator car. The movement management unit 19 sends the speed reference to the control part 8 of dynamic braking via the serial communications bus between the movement control unit 19 and the frequency converter. The control part 8 of dynamic braking determines the activation delay of dynamic braking on the basis of the speed data of the hoisting machine and the speed reference of the hoisting machine, always using in the determination whichever of these that has the greater absolute value. The activation delay t of dynamic braking is defined by means of the instantaneous speed/speed reference v of the hoisting machine and by means of the average deceleration with machinery braking a from the equation:

$$t = \frac{v}{a}$$

In this case the higher the speed of rotation v of the hoisting machine is when the control part 8 of dynamic braking receives an emergency stop signal 7, the longer is the activation delay of dynamic braking.

The machinery brake 2 is activated after a certain activation delay of machinery braking. The activation delay of machinery braking is affected by, among other things, the disconnection time of the current of the coil of the electromagnet of the machinery brake 2 and also by the time it takes to engage the armature part to mechanically brake the movement of a rotating part of the hoisting machine 4. After the armature part is engaged to mechanically brake the movement of the rotating part of the hoisting machine 4, and thus after the machinery brake is activated, the speed of rotation of the hoisting machine 4 starts to decelerate such that after the activation delay of dynamic braking the speed of rotation has decelerated sufficiently in order to start dynamic braking. In this case the control part 8 of dynamic braking short-circuits the stator windings of the hoisting machine 4 in the manner described above. Because the source voltage induced in the stator windings of the hoisting machine 4 is proportional to the speed of rotation, reducing the speed of rotation also affects the short-circuit current flowing in the stator windings at the starting moment of dynamic braking such that the short-circuit current decreases as the speed of rotation decreases.

For example, in connection with machinery brake tests of a hoisting machine and/or safety gear tests of an elevator car, the dynamic braking function is temporarily removed from use. Removal from use occurs by supplying a parameter that refers to prevention mode of dynamic braking to the control part 8 of dynamic braking via the user panel 18 of the movement management unit of the elevator car. In this case when it receives the parameter the control part 8 of dynamic braking switches into prevention mode of dynamic braking. The control part 8 of dynamic braking switches from prevention mode of dynamic braking back into normal mode of dynamic braking, e.g. when it detects the initiation of the next run of the elevator; thus prevention mode of dynamic braking is only in use during the time between runs, e.g. when the elevator car is allowed to move by opening the machinery brake manually. The control part 8 of dynamic braking switches from prevention mode of dynamic braking into normal mode of dynamic braking also when it receives a parameter that refers to normal mode of dynamic braking from the user panel 18 and also when it detects a communication break in the serial communications between the user panel 18 and the frequency converter. With this it can be ensured that the dynamic braking function is returned back to use always after performing machinery brake tests/safety gear tests.

Figure 3B:
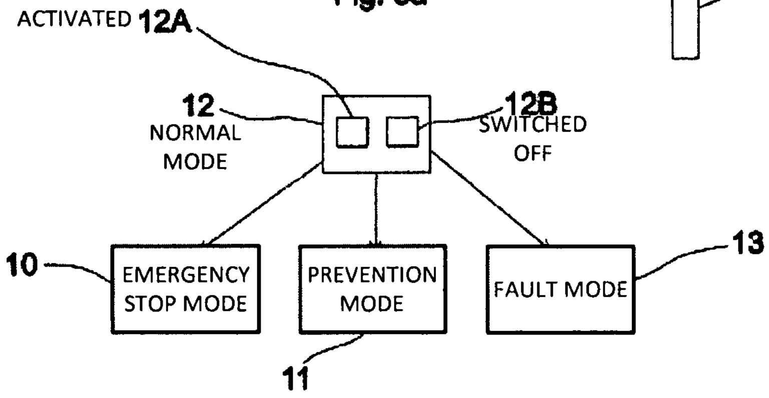
FIG. 3*b* presents possible control modes of the controller according to the invention as a status chart

FIG. 3*b* illustrates e.g. the control modes of the controller 8 of the apparatus for dynamic braking according to any of the preceding embodiments. During normal mode 12 of dynamic braking, dynamic braking is either activated 12A or switched off 12B such that the activation and switching off of dynamic braking are selected on the basis of the control signal of the braking apparatus. When it receives an emergency stop signal the controller 8 switches from normal mode 12 into emergency stop mode 10, in which case dynamic braking is activated after a delay with respect to the machinery brake, e.g. such as is described in any of the preceding embodiments. The controller 8 switches from normal mode 12 into prevention mode 11 of dynamic braking when it receives a parameter that refers to prevention mode of dynamic braking, e.g. in the manner presented in the embodiment of FIG. 3*a*. If a failure is detected in the apparatus for dynamic braking, the controller switches into fault mode 13. In one embodiment of the invention, the controller 8 also sends information about the fault to the user interface 18.

In the preceding the invention is described in connection with an elevator system with counterweight; the solution according to the invention is suited, however, also to elevator systems without counterweight.

The invention is not limited solely to the embodiments described above, but instead many variations are possible within the scope of the inventive concept defined by the claims below.

The invention claimed is:

1. A braking apparatus comprising:

an apparatus for dynamic braking configured to brake an electric machine with dynamic braking;

an input for a control signal of the braking apparatus; and a controller configured to enter one of at least a first control mode and a second control mode in response to the control signal, the controller being further configured to control activation of the apparatus for dynamic braking differently in the first and second control modes; wherein the controller is configured to activate the apparatus for dynamic braking after a delay with respect to activation of a machinery brake when in the first control mode, and a length of the delay is based on at least a speed of the electric machine.

2. The braking apparatus according to claim 1, further comprising:

the machinery brake configured to brake the electric machine; wherein the control signal of the braking apparatus is an emergency stop signal, and the controller is configured to enter the first control mode in response to the emergency stop signal.

3. The braking apparatus according to claim 1, further comprising:

a controllable switch having a control pole fitted in connection with the controller, the control pole being configured to control the controllable switch with a switching reference formed by the controller.

4. The braking apparatus according to claim 1, wherein the control signal is an emergency stop signal and the controller is configured to enter the first control mode in response to the emergency stop signal, and wherein the delay is a set activation delay of dynamic braking.

5. The braking apparatus according to claim 4, further comprising:

the machinery brake configured to brake the electric machine; wherein the machinery brake is configured to be activated after an activation delay of machinery braking subsequent to receiving the emergency stop signal, and the set activation delay of dynamic braking is longer than the activation delay of machinery braking.

6. The braking apparatus according to claim 4, wherein the controller comprises:

an input for speed data of the electric machine; wherein the set activation delay of dynamic braking is determined based on the speed data of the electric machine.

7. The braking apparatus according to claim 6, wherein the controller comprises:

a bus for receiving a speed reference of the electric machine; wherein the set activation delay of dynamic braking is determined based on one of the speed data of the electric machine and the speed reference of the electric machine having the greater absolute value.

8. The braking apparatus according to claim 1, further comprising:

a user interface; wherein the controller includes a memory, and a data transfer connection connects the user interface and the controller to record a control parameter of dynamic braking to be supplied from the user interface to the memory.

9. The braking apparatus according to claim 8, wherein the control parameter of dynamic braking is at least one of the following:

prevention mode of dynamic braking, normal mode of dynamic braking, nominal speed of the electric machine, average deceleration of the electric machine with machinery braking, and status data of the apparatus for dynamic braking.

10. The braking apparatus of claim 1, wherein the controller is configured to control timing of activation of the apparatus for dynamic braking differently in the first and second control modes.

11. The braking apparatus of claim 1, wherein the delay is determined based on the speed of the electric machine and a deceleration of the electric machine resulting from the machinery brake.

12. The braking apparatus of claim 11, wherein the apparatus for dynamic braking comprises:

an activation circuit configured to activate the apparatus for dynamic braking by short-circuiting stator windings of the electric machine after the delay and in response to a current signal from the controller.

13. A braking apparatus comprising:

a machinery brake configured to brake an electric machine;

an apparatus for dynamic braking configured to brake the electric machine with dynamic braking;

an input for an emergency stop signal; wherein the machinery brake is configured to be activated in response to the emergency stop signal, the apparatus for dynamic braking is configured to be activated in response to the emergency stop signal, and after a delay relative to activation of the machinery brake, and a length of the delay is based on at least a speed of the electric machine.

14. An electric drive, comprising:

an electric machine including a braking apparatus for braking the electric machine, the braking apparatus including:

an apparatus for dynamic braking configured to brake the electric machine with dynamic braking, an input for a control signal of the braking apparatus, and a controller configured to enter one of at least a first control mode and a second control mode in response to the control signal, the controller being further configured to control activation of the apparatus for dynamic braking differently in the first and second control modes, wherein the controller is configured to activate the apparatus for dynamic braking after a delay with respect to activation of a machinery brake when in the first control mode, and a length of the delay is based on at least a speed of the electric machine.

15. The electric drive according to claim 14, wherein the electric machine includes a permanent-magnet synchronous motor.

16. The electric drive according to claim 14, further comprising:

a frequency converter connected to the electric machine and configured to drive the electric machine, the frequency converter including an inverter configured to supply variable amplitude and variable frequency current to the electric machine.

17. The electric drive according to claim 16, wherein the controller is fitted in connection with control poles of switches of at least one of an upper branch of the inverter and a lower branch of the inverter, to switch the switches of only the lower branch of the inverter, or alternatively of only the upper branch of the inverter.

18. The electric drive according to claim 16, wherein the frequency converter comprises:

a network inverter-rectifier configured to supply electrical energy produced in regenerative operation of the electric machine to the electricity network.

19. The electric drive according to claim 16, wherein the frequency converter includes a direct-current intermediate circuit, and the electric drive includes a power source, an input of the power source being connected to the direct-current intermediate circuit of the frequency converter, and an output of the power source being connected to an electricity supply of the controller in order to utilize electrical energy produced in regenerative operation of the electric machine as operating electricity of the controller.

20. The electric drive according to claim 14, wherein the apparatus for dynamic braking is configured to short-circuit excitation windings of the electric machine to dynamically brake the electric machine.

21. The electric drive according to claim 14, wherein the electric drive is implemented without a braking resistor.

22. An elevator system comprising:

an electric drive to move an elevator car in an elevator hoistway, the electric drive including an electric machine having a braking apparatus for braking the electric machine, the braking apparatus including:

an apparatus for dynamic braking configured to brake the electric machine with dynamic braking, an input for a control signal of the braking apparatus, and a controller configured to enter one of at least a first control mode and a second control mode in response to the control signal, the controller being further configured to control activation of the apparatus for dynamic braking differently in the first and second control modes, wherein the controller is configured to activate the apparatus for dynamic braking after a delay with respect to activation of a machinery brake when in the first control mode, and a length of the delay is based on at least a speed of the electric machine.

23. The elevator system according to claim 22, wherein a hoisting machine and a frequency converter are fitted in the elevator hoistway.

24. The elevator system according to claim 22, wherein a user interface is fitted outside the elevator hoistway.

25. A braking apparatus comprising:

an apparatus for dynamic braking configured to brake an electric machine with dynamic braking;

an input for a control signal of the braking apparatus; and a controller configured to enter one of at least a first control mode and a second control mode in response to the control signal, the controller being further configured to control activation of the apparatus for dynamic braking differently in the first and second control modes, wherein the controller is configured to switch into prevention mode of dynamic braking in response to a parameter that refers to prevention mode of dynamic braking from the user interface, and the controller is configured to switch from the prevention mode into a normal mode of dynamic braking in response to detection of at least one of, initiation of a next run of the elevator, and a parameter that refers to the normal mode of dynamic braking from a user interface.

* * * * *